United States Patent Office
3,227,764
Patented Jan. 4, 1966

3,227,764
SEPARATION OF CIS AND TRANS ISOMERS OF TETRAALKYL - 1,3 - CYCLOBUTANEDIOLS AND NOVEL COMPOUND OBTAINED THEREBY
James C. Martin and Edward U. Elam, Kingsport, Tenn., assignors to Eastman Kodak Company, Rochester, N.Y., a corporation of New Jersey
No Drawing. Filed Dec. 30, 1960, Ser. No. 79,492
3 Claims. (Cl. 260—617)

This invention relates to the separation of 2,2,4,4-tetraalkyl-1,3-cyclobutanediols into their cis and trans isomers and to a novel isomer so obtained.

An object of our invention is to provide a method for obtaining the individual cis and trans isomers of 2,2,4,4-tetraalkyl-1,3-cyclobutanediols. Another object is to provide a method for separating such isomers from a mixture thereof. Still another object is to provide a novel isomer of 2,2,4,4-tetramethyl-1,3-cyclobutanediol melting at about 163° C.

These and other objects are accomplished by the method of our invention which, in general, comprises forming a monocarboxylic acid diester of a 2,2,4,4-tetraalkyl-1,3-cyclobutanediol composed of the cis and trans isomers. Preferably, the diol is esterified with a low molecular weight monocarboxylic acid such as formic acid. The resulting diester is cooled to a temperature at which the trans (high melting) isomer crystallizes and the liquid cis (low melting) isomer is separated from the trans isomer.

The preparation of 2,2,4,4-tetramethyl-1,3-cyclobutanediol was reported in the thesis of Leon L. Miller ("The Structure of Some Derivatives of Dimethylketene," Ph.D. Thesis, Cornell University, 1937). Miller hydrogenated the dimer of dimethyl ketene (2,2,4,4-tetramethyl-1,3-cyclobutanedione) over Raney nickel catalyst and obtained a white, crystalline solid that he identified as 2,2,4,4-tetramethyl-1,3-cyclobutanediol. By fractional sublimation he separated the solid into fractions and concluded that the solid was a mixture of two substances, one melting at 127–128° C. and the other at 147–148° C. He called these the cis and trans isomers, respectively, of the diol.

We have now developed a method for separating the isomers of such cyclobutanediols that is superior to the fractional sublimation technique and we have unexpectedly obtained results different from those reported by Miller. Specifically, we have separated 2,2,4,4-tetramethyl-1,3-cyclobutanediol into two compounds melting at 147–148° C. and at 162.5–163° C. Infrared and nuclear magnetic resonance spectra indicate that the high melting compound is the cis isomer and that the low melting one is the trans isomer. From this we conclude that Miller's substance melting at 127–128° C. was a mixture of cis and trans isomers.

In the first stage of our method the mixture of cis and trans isomers of the diol is converted to a diester of a monocarboxylic acid by any of the known procedures for esterifying alcohols. A suitable method comprises heating to reflux temperature a mixture of the diol with a monocarboxylic acid, an esterification catalyst and a liquid that forms a low-boiling azeotrope with water. Suitable catalysts include sulfuric acid, hydrochloric acid, p-toluene-sulfonic acid and the like. Suitable azeotroping liquids include benzene, toluene, etc. Esterification procedures for diols of the type with which we are concerned are described in the co-pending patent application of James C. Martin and Kent C. Brannock, Serial No. 18,465, filed March 30, 1960, now Patent 3,062,852.

Esterifying agents other than acids can be used, including monocarboxylic acid chlorides and anhydrides. Also the diol can be esterified by alcoholysis with a monocarboxylic acid ester.

Preferably, we employ an esterifying agent that forms a diester of which the trans isomer is a solid and the cis isomer a liquid at room temperature. This simplifies the procedure, making it possible to separate the trans and cis isomers of the esters without cooling or heating the mixture. We have found that the trans isomers of the diformate and diacetate esters of 2,2,4,4-tetramethyl-1,3-cyclobutanediol crystallize out at room temperature while the cis isomer remains liquid. Therefore, formic acid, acetic acid and the corresponding acid chlorides, anhydrides and esters are preferred esterifying agents for this particular diol. However other esterifying agents can be employed if the esterification product is either cooled or heated, as appropriate, to selectively crystallize or liquify the trans or the cis isomer of the ester mixture. In general, esterifying agents that can be used include those that form with the diol a diester of the formula:

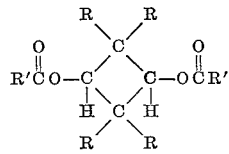

wherein R is $C_1$ to $C_4$ alkyl and R' is hydrogen or $C_1$ to $C_9$ alkyl.

Following the esterification stage, the diester mixture is allowed to stand at the appropriate temperature at which the trans isomer crystallizes from the liquid mixture containing the liqid cis isomer. The solid and liquid are then separated by rapid filtration, centrifuging or other suitable methods. The trans ester is preferably recrystallized and pure trans diol is obtained by alcoholysis or hydrolysis of the purified trans isomer of the ester. The cis-rich portion is similarly converted to the diol and pure cis isomer is obtained by fractional recrystallization. Either hydrolysis or alcoholysis can be used to reconvert the ester to the diol, but we prefer to use base-catalyzed alcoholysis because of the mildness of the conditions.

The method of our invention is useful in general for separating the cis and trans isomers of 2,2,4,4-tetraalkyl-1,3-cyclobutanediols in which the alkyl groups have from 1 to 4 carbon atoms. Inasmuch as our process separates isomers of the diol according to differences in melting points of esters thereof, the number of isomers must be limited. Therefore, the process is limited to the separation of diols in which all of the alkyl groups are of the same type.

The following examples illustrate the method of the invention and uses of its products.

*Example 1*

*Preparation of formate ester.*—A solution of 321 g. of 2,2,4,4-tetramethyl-1,3-cyclobutanediol (a mixture of approximately equal amounts of cis and trans isomers), 276 g. of formic acid, and 200 ml. of benzene was refluxed for 5 hrs. The solution was cooled, another 276-g. quantity of formic acid was added, and refluxing was continued for 4 hrs. After being cooled, the solution was diluted with benzene, washed with water, dilute bicarbonate solution, and again with water, and finally dried over sodium sulfate. Distillation through a 48-inch packed column gave, after removal of the solvent, 315 g. (70% yield) of 2,2,4,4-tetramethyl-1,3-cyclobutanediol diformate, B.P. 132–133° C. (53 mm.). The purity of this material, as determined by gas chromatography, was 98%.

*Trans isomer.*—On standing at room temperature, the 2,2,4,4-tetramethyl-1,3-cyclobutanediol diformate (315 g.) deposited a large portion of crystalline material. Filtration of this mixture gave 167 g. of solid, M.P. 58–65° C., which was recrystallized from petroleum ether to give 144 g. of trans-2,2,4,4-tetramethyl-1,3-cyclobutanediol diformate, M.P. 67–68° C. A 132-g. portion of this material was dissolved in a solution of 2 g. of sodium in 900 ml. of methanol and allowed to stand at room temperature for 24 hrs. After addition of 9 ml. of acetic acid, the solution was evaporated to dryness on a steam bath and the solid residue was dissolved in 900 ml. of boiling toluene. The hot toluene solution was filtered to remove sodium acetate, concentrated to a volume of 450 ml., and allowed to cool. The crystalline glycol (trans-2,2,4,4-tetramethyl-1,3-cyclobutanediol) was filtered from the solution and dried in a 100° C. oven; it weighed 78 g. and melted sharply at 148° C.

*Cis isomer.*—The liquid portion of the 2,2,4,4-tetramethyl-1,3-cyclobutanediol diformate (143 g. recovered from the separation described above) was converted to the free glycol by the same methanolysis procedure that was applied to the solid diformate. After the crystallization from toluene, the mixture of glycol isomers (79 g.) melted at 130–154° C. A 57-g. sample was dissolved in 400 ml. of refluxing toluene, the solution was cooled to 80° C., and the liquid was decanted from the glycol which had crystallized. The crystallized glycol was dissolved in another 400-ml. portion of boiling toluene; the solution was cooled to 100° C. and decanted from the crystallized product. At this point, the recrystallized glycol weighed 24 g. and melted at 160–163° C. A final recrystallization from 350 ml. of toluene gave 22 g. of pure cis-2,2,4,4-tetramethyl-1,3-cyclobutanediol, M.P. 162.5–163.5° C.

*Example 2*

*Preparation of acetate ester.*—A 450 g. (4.4 moles) portion of acetic anhydride and 2 g. of anhydrous zinc chloride were added to 296.5 g. (2.06 moles) of 2,2,4,4-tetramethylcyclobutane-1,3-diol. The resulting mixture began to reflux spontaneously and all of the diol dissolved within a few minutes. The mixture was allowed to stand for about 15 hours, refluxed for 2 hours, cooled to room temperature and then filtered. The acetic acid in the resulting mixture was removed by distillation and thereafter 431 g. of 2,2,4,4-tetramethylcyclobutane-1,3-diol diacetate was distilled off at a temperature of 110° to 112° C. under a pressure of 13 mm. of mercury. This ester material had the following analysis based on the empirical formula, $C_{12}H_{20}O_4$:

Saponification Equivalent (found) = 114.5
Saponification Equivalent (calculated) = 114

The diacetate ester was allowed to stand for a few days at room temperature during which time it deposited a highly crystalline solid. Filtration of 763.6 g. of the ester gave 190.7 g. of a greasy solid and 572.4 g. of a liquid filtrate. The solid was recrystallized by dissolving in warm hexane, chilling to 0° C. and filtering cold. There was obtained 128.3 g. of trans-2,2,4,4-tetramethyl-1,3-cyclobutanediol diacetate, M.P. 43–44° C. A 104.5-g. portion of this material was added to 800 ml. of methanol containing 2 g. of sodium and allowed to stand at room temperature for 24 hrs. The solution was neutralized by the addition of 10 ml. of acetic acid, and the solution was taken to dryness on the steam bath. The residue was dissolved in 400 ml. of refluxing toluene, filtered and allowed to cool. The white solid that precipitated was removed by filtration and dried in a 60° C. oven to give 53.8 g. of trans-2,2,4,4-tetramethyl-1,3-cyclobutanediol, M.P. 147.5–148° C.

There are a number of advantages in recovering the individual cis and trans isomers of the tetraalkyl-1,3-cyclobutanediols, as is now made possible by the method of the invention. For example, a valuable type of derivative of these diols comprises polyesters such as diphenyl terephthalate polyester prepared from 2,2,4,4-tetramethyl-1,3-cyclobutanediol. It has been found that such polyesters prepared from the diol as normally obtained, i.e., a mixture of the cis and trans isomers thereof, have different properties from the corresponding polyesters prepared from the individual cis and trans isomers of the diol. Thus, a polyester prepared from the cis diol has been found to have a more narrow melting range (296–308° C.) than that of corresponding polyester prepared from the cis and trans diol mixture (270–320° C.). A narrow melting range can be advantageous when the polymer is to be subjected to melt spinning or extrusion. This same polyester made from the cis diol also had a higher heat distortion (212° C.) than the polyester made from the mixed isomers (185° C.). Still further, the polymer of the pure cis diol was completely soluble in methylene chloride while the terephthalate from the mixed isomers was not. This property of the cis product is advantageous in solvent casting of films.

In still another comparison it has been found that a terephthalate polyester of the trans diol had a markedly higher melting point (above 350° C.) than that of the cis diol or of the mixed diol isomers. Such a high melting point is, of course, desirable in films and fibers.

Preparation of polyesters such as discussed above from the individual cis and trans isomers of a 2,2,4,4-tetraalkyl-1,3-cyclobutanediol and from the unseparated mixture of such isomers is disclosed in the copending patent application of Elam, Martin and Gilkey, Serial No. 860,375, filed December 18, 1959.

We have found still another advantage in separating the tetraalkyl-1,3-cyclobutanediols into their cis and trans isomers. Thus, in the case of tetramethyl-1,3-cyclobutanediol we have found that the higher melting isomer (M.P. 163° C.), which we designate as the cis isomer and which we are the first to obtain, exhibits unusual stability in comparison to the lower melting trans isomer (M.P. 148° C.) obtained by Miller. Unlike the trans diol (M.P. 148° C.), the cis diol (M.P. 163° C.) is not altered by an acid-catalyzed cleavage reaction. This stability of the higher melting diol is not only unexpected, it is of considerable utility in acid-catalyzed esterifications.

The following example demonstrates that when a polyester resin was prepared from a mixture of cis- and trans-2,2,4,4-tetramethyl-1,3-cyclobutanediol a large amount of the trans isomer was converted to a by-product, 2,2,4-trimethyl-3-pentenal.

*Example 3*

Under an inert atmosphere, 6 moles (856 g.) of 2,2,4,4-tetramethyl-1,3-cyclobutanediol (50% trans and 50% cis), 2.5 moles (370 g.) of phthalic anhydride and 1.54 g. of dibutyltin oxide were heated at 200° C. for 11 hr. At this point 47 ml. of water had been removed from the reaction mixture and the acid number was 47. The mixture was cooled and 2.5 moles (245 g.) of maleic anhydride added. After 3.5 hr. at 195–200° C. 47 ml. of water had been removed. The acid number of the product was 62. The polyester was subjected to melt phase polymerization at 200° C. and approximately 5 mm. Hg for 2 hr. The final product had an acid number of 36 and an average molecular weight of 1410. In addition to the water of esterification, 79 g. of an organic material was collected in the water trap. This material was identified as almost pure 2,2,4-trimethyl-3-pentenal. Based on a 50% mixture of diol isomers, this represents a loss of 21% of trans isomer to this by-product.

The following example shows that under the same conditions as Example 4, no 2,2,4-trimethyl-3-pentenal was formed when pure cis-2,2,4,4-tetramethyl-1,3-cyclobutanediol was used.

Example 4

The following ingredients were combined under the condition described in Example 3 to give a polyester:

1.15 moles (161.4 g.) cis-2,2,4,4-tetramethyl-1,3-cyclobutanediol
0.475 mole (70.4 g.) phthalic anhydride
0.475 mole (46.5 g.) maleic anhydride
0.292 g. dibutyltin oxide The first step of the reaction required 12 hr. at 200° C. An acid number of 41 was reached during this phase of the reaction. An acid number of 55 was reached 5 hr. after the addition of the maleic anhydride. The acid number of the polyester after the melt phase polymerization was found to be 29 and a molecular weight of 1500 was obtained. No 2,2,4-trimethyl-3-pentenal was formed during this reaction.

The invention has been described in considerable detail with particular reference to certain preferred embodiments thereof, but it will be understood that variations and modifications can be effected within the spirit and scope of the invention as described hereinabove, and as defined in the appended claims.

We claim:

1. The method of separating into its cis and trans isomers a 2,2,4,4-tetraalkyl-1,3-cyclobutanediol of which the four alkyl substituents have 1 to 4 carbon atoms and are all the same, which comprises reacting said diol comprising a mixture of the cis and trans isomers thereof with an esterifying agent to form a diester of the formula:

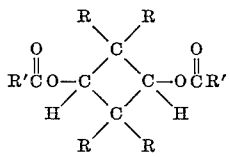

wherein R is $C_1$ to $C_4$ alkyl and R' is selected from the group consisting of hydrogen and $C_1$ to $C_9$ alkyl, maintaining said diester at a temperature at which the diester of the trans diol is solid and the diester of the cis is liquid, separating the liquid from the solid and reconverting the separated diester isomers to the corresponding individual cis and trans isomers of the diol.

2. The method of separating 2,2,4,4-tetramethyl-1,3-cyclobutanediol into its cis and trans isomers which comprises reacting said diol comprising a mixture of the cis and trans isomers with an enterifying agent to form a diester reaction product selected from the group consisting of the diformate and diacetate diesters of the diol, maintaining the esterification reaction product at a temperature at which the diester of the trans diol is a solid and the diester of the cis is a liquid, separating the solid diester of the trans diol from the liquid rich in the diester of the cis diol, reconverting the liquid diester to the diol, and subjecting the resulting diol to fractional recrystallization to recover purified cis-2,2,4,4-tetramethyl-1,3-cyclobutanediol having a melting point of about 163° C.

3. The method of separating 2,2,4,4-tetramethyl-1,3-cyclobutanediol into its cis and trans isomers which comprises reacting said diol comprising a mixture of the cis and trans isomers with an esterifying agent to form a diester reaction product selected from the group consisting of the diformate and diacetate diesters of the diol, maintaining the esterification reaction product at a temperature at which the diester of the trans diol is a solid and the diester of the cis diol is a liquid, separating the solid diester of the trans diol from the liquid rich in the diester of the cis diol, purifying said solid by recrystallization, and reconverting the purified diester by alcoholysis to the diol to obtain trans-2,2,4,4-tetramethyl-1,3-cyclobutanediol having a melting point of about 148° C.

References Cited by the Examiner

UNITED STATES PATENTS

| | | | |
|---|---|---|---|
| 2,936,324 | 5/1960 | Hasek et al. | 260—617 |
| 3,062,852 | 11/1962 | Martin et al. | 260—476 |

LEON ZITVER, *Primary Examiner.*

CHARLES B. PARKER, *Examiner.*